United States Patent
Shioiri et al.

(10) Patent No.: US 11,906,046 B2
(45) Date of Patent: Feb. 20, 2024

(54) SHIFTING MECHANISM

(71) Applicant: TOYOTA JIDOSHA KABUSHIKI KAISHA, Toyota (JP)

(72) Inventors: Hiroyuki Shioiri, Yokohama (JP); Kensei Hata, Sunto-gun (JP); Kenta Kimura, Numazu (JP); Hiroaki Ebuchi, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/933,268

(22) Filed: Sep. 19, 2022

(65) Prior Publication Data

US 2023/0108881 A1    Apr. 6, 2023

(30) Foreign Application Priority Data

Oct. 6, 2021  (JP) .................. 2021-164444

(51) Int. Cl.
*F16H 63/04* (2006.01)
*F16H 63/08* (2006.01)
*F16H 63/32* (2006.01)

(52) U.S. Cl.
CPC ............. *F16H 63/04* (2013.01); *F16H 63/08* (2013.01); *F16H 63/32* (2013.01)

(58) Field of Classification Search
CPC .......... F16H 63/04; F16H 63/08; F16H 63/32; F16H 2063/3089; F16H 2063/322; F16H 63/18
See application file for complete search history.

(56) References Cited

U.S. PATENT DOCUMENTS

| | | | |
|---|---|---|---|
| 10,591,036 B2 * | 3/2020 | Matsuura | F16H 57/038 |
| 2014/0083228 A1 | 3/2014 | Mitsubori et al. | |
| 2018/0031097 A1 * | 2/2018 | Matsuura | F16H 3/006 |
| 2018/0328487 A1 * | 11/2018 | Nishimoto | F16H 63/3416 |
| 2022/0163111 A1 * | 5/2022 | Nishimoto | F16H 63/3466 |
| 2023/0062099 A1 * | 3/2023 | Quinn | B60K 1/02 |
| 2023/0099862 A1 * | 3/2023 | Hata | F16H 63/30 |
| | | | 74/473.37 |

FOREIGN PATENT DOCUMENTS

| | | |
|---|---|---|
| JP | 2015-81634 A | 4/2015 |
| JP | 5869459 B2 | 2/2016 |

* cited by examiner

*Primary Examiner* — Victor L MacArthur
(74) *Attorney, Agent, or Firm* — Oblon, McClelland, Maier & Neustadt, L.L.P.

(57) ABSTRACT

A shifting mechanism, in which a movable member integrated with an engagement pin will not be rotated by a friction acting between a cam groove and the engagement pin, includes: a shift drum that on which a cam groove is formed; a cam sleeve having an engagement pin inserted into the cam groove; a fork shaft reciprocated between predetermined positions by rotating the shift drum; a support stem extending parallel to a center axis of the cam sleeve; and a projection formed integrally with the cam sleeve to come into contact with the support stem when the cam sleeve is rotated.

2 Claims, 6 Drawing Sheets

SHIFTING MECHANISM

The present disclosure claims the benefit of Japanese Patent Application No. 2021-164444 filed on Oct. 6, 2021 with the Japanese Patent Office, the disclosure of which is incorporated herein by reference in its entirety.

BACKGROUND

Field of the Disclosure

The present disclosure relates to the art of a shifting mechanism in which a shift fork is reciprocated by rotating a shift drum on which a cam groove is formed.

Discussion of the Related Art

JP-A-2015-81634 describes a drum type transmission comprising: a shift drum on which a plurality of cam grooves is formed; a plurality of fork shafts each of which is provided with an engagement pin; and a plurality of shift forks reciprocated together with the fork shafts. Each of the shift forks is individually joined to a sleeve on which dog teeth are formed, and the sleeve is reciprocated together with the shift fork. Therefore, the dog teeth of the sleeve are engaged with another dog teeth to establish a predetermined gear stage by moving the sleeve.

Thus, the drum type transmission described in JP-A-2015-81634 shifts the gear stage by rotating the shift drum at a predetermined rotational angle. In the drum type transmission of this kind, therefore, the gear stage is shifted in order. That is, in a case of shifting a gear stage to a target stage that is two or more stages lower or higher than a current stage, the gear stage is shifted from the current stage to the target stage via an interim stage(s). In this case, therefore, it takes longer time to shift the gear stage to the target stage. In order to avoid such disadvantage, according to the teachings of JP-A-2015-81634, the fork shaft is connected to the shift fork though a spring so that the fork shaft is allowed to be moved by rotating the shift drum even before the predetermined sleeve is moved to an engagement position.

JP-B-5869459 describes a shift drum structure in which a shift fork is reciprocated by rotating a shift drum. In the shift drum structure taught by JP-B-5869459, a shift fork is engaged with a shift fork groove of a shifter member on which clutch teeth are formed, and an engagement pin of the shift fork is guided by a guide groove of the shift drum.

As described, in the drum type transmission described in JP-A-2015-81634, the fork shaft is connected to the shift fork through the spring. In the drum type transmission described in JP-A-2015-81634, therefore, the spring is compressed to absorb a difference between movement distances of the shift fork and the fork shaft in the event of interference between the dog teeth of the sleeve and the dog teeth to be engaged therewith. For this reason, the dog teeth will not be subjected to an excessive load, and the shift drum is allowed to rotate smoothly.

However, when reciprocating the fork shaft by rotating the shift drum in the drum type transmission described in JP-A-2015-81634, the engagement pin sliding on the cam groove of the shift drum is subjected not only to a friction in a rotational direction of the fork shaft, but also to a pushing force in an axial direction. In the drum type transmission described in JP-A-2015-81634, specifically, the fork shaft and the shift fork are formed separately. Therefore, a posture of the fork shaft would be changed by the above-mentioned friction when a load to rotate the fork shaft is applied to the fork shaft. As a result, the engagement pin is inclined thereby increasing a sliding resistance between the engagement pin and the cam groove. In addition, a position of the shift fork would be changed if an engagement site between the engagement pin and the cam groove is displaced from a desired site.

Whereas, in the shift drum structure taught by JP-B-5869459, the engagement pin fitted into the guide groove of the shift drum is formed integrally with the shift fork fitted with the shifter member such as the sleeve. In the shift drum structure taught by JP-B-5869459, therefore, the shift fork is prevented from being rotated by a reaction force established by the shifter member to counteract the above-mentioned friction. However, the dog teeth would be subjected to an excessive load in the event of interference between the sets of dog teeth, and the shift drum may not be rotated smoothly.

SUMMARY

Aspects of preferred embodiments of the present disclosure have been conceived noting the foregoing technical problems, and it is therefore an object of the present disclosure to provide a shifting mechanism in which a movable member integrated with an engagement pin will not be rotated by a friction acting between a cam groove and the engagement pin.

An exemplary embodiment of the present disclosure relates to a shifting mechanism, comprising: a shift drum on which a cam groove is formed; a cam sleeve having an engagement pin that is inserted into the cam groove to be reciprocated by the cam groove; and a fork shaft that is reciprocated between predetermined positions by a thrust force of the cam sleeve established by rotating the shift drum. In order to achieve the above-explained objective, according to the exemplary embodiment of the present disclosure, the shifting mechanism is provided with: a support stem that extends parallel to a center axis of the cam sleeve; and a projection that is formed integrally with the cam sleeve to come into contact with the support stem when the cam sleeve is rotated around the center axis.

In a non-limiting embodiment, the cam sleeve and the fork shaft may be connected to each other while being allowed to rotate relatively to each other.

In a non-limiting embodiment, the shifting mechanism may further comprise an elastic member that is deformed in a situation where a traveling amount of the cam sleeve in an axial direction along the center axis of the cam sleeve and a travelling amount of the fork shaft in the axial direction are different.

In a non-limiting embodiment, the projection may comprise a through hole to which the support stem is inserted.

In a non-limiting embodiment, the through hole may include a slotted hole having a length in a direction along a normal line of the cam sleeve longer than a width thereof.

In a non-limiting embodiment, the through hole may include a cutout opening toward the support stem.

In a non-limiting embodiment, the cam sleeve may include a first cam sleeve and a second cam sleeve spaced at a predetermined interval in a rotational direction of the shift drum. The support stem may comprise a first contact section protruding toward the first cam sleeve, and a second contact section protruding toward the second cam sleeve. The projection may include a first projection formed integrally with the first cam sleeve, and a second projection formed integrally with the second cam sleeve. The first projection may comprise a first cutout to which the first contact section is inserted, and which comes into contact with the first contact section when the first cam sleeve is rotated around a center axis thereof. The second projection may comprise a second cutout to which the second contact section is inserted, and which comes into contact with the second contact section when the second cam sleeve is rotated around a center axis thereof.

In a non-limiting embodiment, the first projection and the second projection may pass each other in an axial direction of the support stem when the first cam sleeve and the second cam sleeve move relatively to each other.

In a non-limiting embodiment, a clearance between a leading end of the first cutout and the first contact section in a circumferential direction around the center axis of the first cam sleeve may be wider than a clearance between a longitudinal center of the first cutout and the first contact section.

In a non-limiting embodiment, a clearance between a leading end of the second cutout and the second contact section in a circumferential direction around the center axis of the second cam sleeve may be wider than a clearance between a longitudinal center of the second cutout and the second contact section.

In a non-limiting embodiment, a clearance between the support stem and an inner wall surface of the through hole in a rotational direction of the cam sleeve may be narrower than a clearance between the support stem and the inner wall surface of the through hole in a direction along a line connecting the cam sleeve and a center axis of the support stem.

As described, the shifting mechanism according to the exemplary embodiment of the present disclosure comprises: the shift drum that on which the cam groove is formed; the cam sleeve having the engagement pin that is inserted into the cam groove to be reciprocated by the cam groove; and the fork shaft that is reciprocated between predetermined positions by a thrust force of the cam sleeve established by rotating the shift drum. In the shifting mechanism, the support stem extends parallel to the center axis of the cam sleeve, and the projection is formed integrally with the cam sleeve. According to the exemplary embodiment of the present disclosure, therefore, the projection of the cam sleeve comes into contact with the support stem when the engagement pin slides on the side walls of the cam groove to prevent a rotation of the come sleeve. That is, a posture of the engagement pin will not be changed by the cam sleeve when rotating the shift drum. For this reason, the sliding resistance between the wall surface of the cam groove and the engagement pin 4 will not be increased, and a damage of the engagement pin may be limited.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIGS. 5A to 5D are cross-sectional views showing a cross-section of the shifting mechanism shown in FIG. 4 along V-V line, in which FIG. 5A shows a situation where a first fork shaft is positioned at a disengagement position and a second fork shaft is positioned at an engagement position, FIG. 5B shows a situation where both of the first fork shaft and the second fork shaft are positioned at the engagement positions, FIG. 5C shows a situation where the first fork shaft is positioned at the engagement position and the second fork shaft is positioned at the disengagement position, and FIG. 5D shows a situation where both of the first fork shaft and the second fork shaft are positioned at the disengagement positions.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure, which do not limit the scope of the present disclosure.

Figure 1:
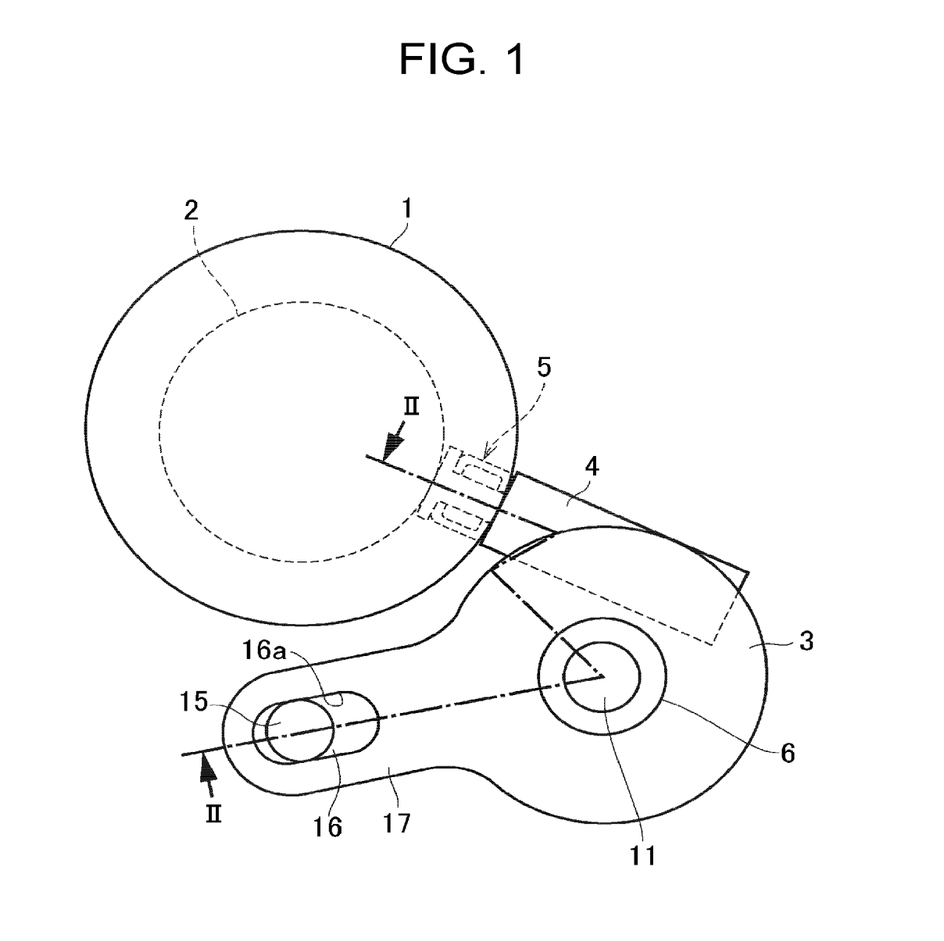
FIG. 1 is a front view showing one example of a structure of the shifting mechanism according to the exemplary embodiment of the present disclosure.

Turning now to FIG. 1, there is shown one example of a structure of the shifting mechanism according to the present disclosure. The shifting mechanism shown in FIG. 1 is adapted to engage and disengage a clutch device (not shown) by rotating a shift drum 1 to reciprocate a cam sleeve 3, a fork shaft 6, and a shift fork 10.

Figure 3:
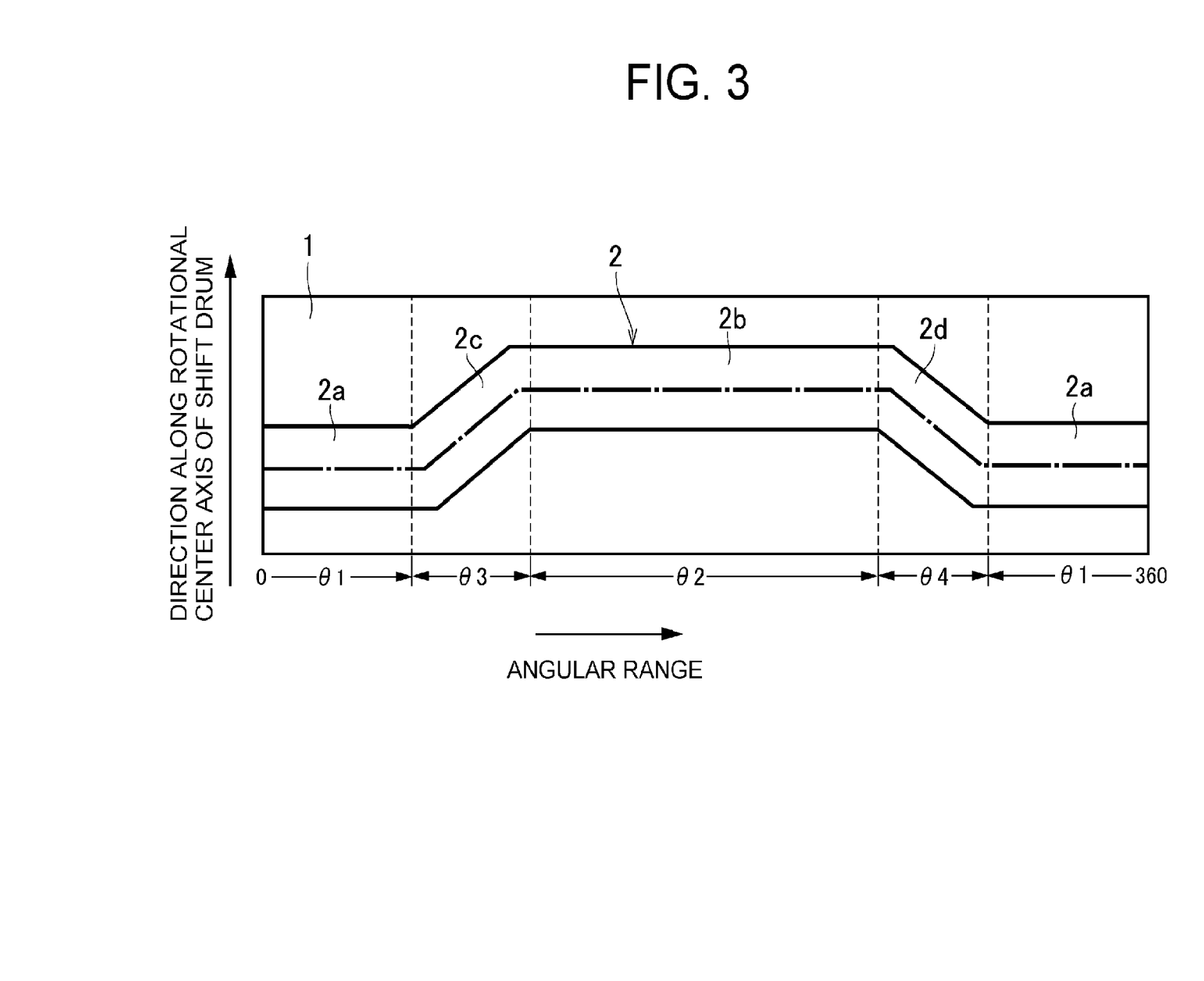
FIG. 3 is a developed view showing one example of a cam groove.

The shift drum 1 as a cylindrical member is rotated by an actuator such as a motor (not shown), and a cam groove 2 is formed on an outer circumferential surface of the shift drum 1 in a zigzag manner entirely or partially in a circumferential direction. One example of the cam groove 2 is shown in FIG. 3. As illustrated in FIG. 3, the cam groove 2 comprises a first groove 2a formed within a first angular range θ1 with respect to a rotational center axis of the shift drum 1, and a second groove 2b formed within a second angular range θ2 with respect to the rotational center axis of the shift drum 1. Specifically, the first groove 2a and the second groove 2b are formed linearly in a rotational direction of the shift drum 1, and offset from each other in a direction along the rotational center axis of the shift drum 1.

The cam groove 2 further comprises a third groove 2c formed between the first groove 2a and the second groove 2b within a third angular range θ3, and a fourth groove 2d formed between the second groove 2b and the first groove 2a within a fourth angular range θ3. As illustrated in FIG. 3, the third groove 2c and the fourth groove 2d are formed diagonally with respect to the rotational center axis of the shift drum 1. As explained later, the above-mentioned clutch is disengaged as long as an engagement pin 4 is positioned within the first groove 2a, and engaged as long as the engagement pin 4 is positioned within the second groove 2b.

Figure 2:
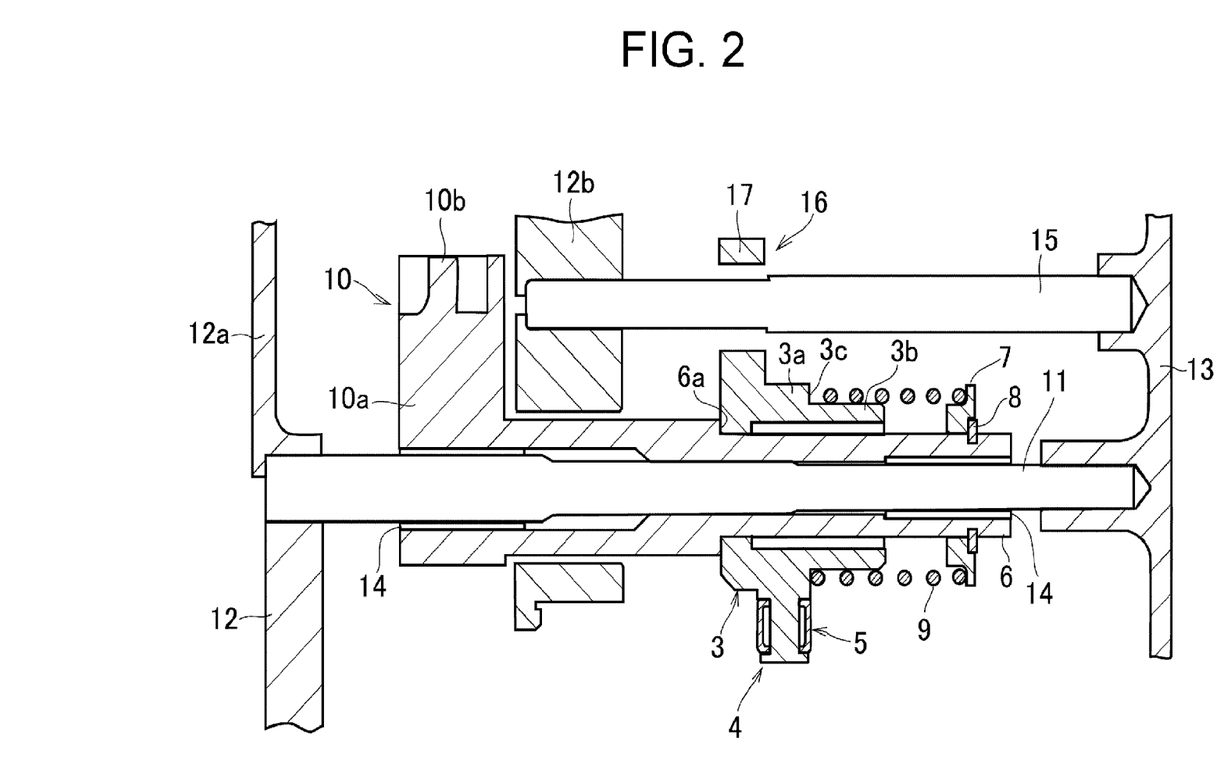
FIG. 2 is a cross-sectional view showing a cross-section of the shifting mechanism along II-II line in FIG. 1.

The cam sleeve 3 also as a cylindrical member is reciprocated in the axial direction according to a rotational angle of the shift drum 1. Turning to FIG. 2, there is shown a cross-section of the shifting mechanism shown along II-II line in FIG. 1. As illustrated in FIG. 2, the cam sleeve 3 comprises a diametrically larger section 3a formed in the left side of a predetermined site in FIG. 2, a diametrically smaller section 3b formed in the right side of the predetermined site in FIG. 2, and a stepped section 3c as a boundary between the diametrically larger section 3a and the diametrically smaller section 3b. In addition, an opening area of the diametrically larger section 3a is smaller than an opening area of the diametrically smaller section 3b.

The above-mentioned engagement pin 4 is formed integrally with the diametrically larger section 3a of the cam sleeve 3 to be inserted into the cam groove 2 of the shift drum 1, and a needle roller bearing (to be simply referred to as bearing) 5 is fitted onto a leading end of the engagement pin 4. Specifically, the bearing 5 fitted onto the engagement pin 4 is inserted into the cam groove 2 along a normal line of the shift drum 1 so that a frictional resistance between the engagement pin 4 and each wall surface of the cam groove 2 can be reduced.

The fork shaft 6 is also a cylindrical member penetrating through a hollow space of the cam sleeve 3, and a retainer 7 is fitted onto one end of the fork shaft 6. Specifically, an outer diameter of the retainer 7 is substantially identical to an outer diameter of the diametrically larger section 3a of the cam sleeve 3, and the retainer 7 is fitted onto a leading end of the fork shaft 6 to be opposed to the stepped section 3c. In addition, a snap ring 8 is also fitted onto the leading end of the fork shaft 6 to prevent a recession of the retainer 7 away from the diametrically larger section 3a, and a coil spring 9 as an elastic member is interposed between the retainer 7 and the diametrically larger section 3a.

When the cam sleeve 3 is moved toward the right side in FIG. 2, the cam sleeve 3, the coil spring 9, and the fork shaft 6 are moved integrally toward the right side in FIG. 2 given that the fork shaft 6 is not in a condition to establish a reaction force. In this situation, given that the fork shaft 6 establishes a reaction force greater than an elastic force of the coil spring 9, the fork shaft 6 stays at a current position so that the coil spring 9 is compressed by the cam sleeve 3. Consequently, the elastic force of the coil spring 9 is applied to the fork shaft 6 according to a compression of the coil spring 9. That is, the coil spring is compressed to absorb a difference between a traveling amount of the cam sleeve 3 in the axial direction and a travelling amount of the fork shaft 6 in the axial direction.

The clutch is engaged by moving the cam sleeve 3 toward the right side in FIG. 2, and disengaged by moving the cam sleeve 3 toward the left side in FIG. 2. Specifically, when the engagement pin 4 is positioned within the second groove 2b as an engagement position, the cam sleeve 3 is positioned in the right side in FIG. 2. Whereas, when the engagement pin 4 is positioned within the first groove 2a as a disengagement position, the cam sleeve 3 is positioned in the left side in FIG. 2.

In order to fix a relative position between the cam sleeve 3 and the fork shaft 6, a stepped section 6a is formed in the fork shaft 6. Specifically, when the cam sleeve 3 is pushed by the coil spring 9 to a farthest position from the retainer 7, an end face of the diametrically larger section 3a of the cam sleeve 3 comes into contact with the stepped section 6a of the fork shaft 6. That is, the end face of the diametrically larger section 3a of the cam sleeve 3 is always brought into contact with the stepped section 6a of the fork shaft 6 except for the situation in which the coil spring 9 is compressed. Specifically, in order to maintain the cam sleeve 3 being in contact with the stepped section 6a of the fork shaft 6 in the situation in which the cam sleeve 3 is positioned at the farthest position from the retainer 7, the coil spring 9 is interposed between the retainer 7 and the diametrically larger section 3a while being slightly compressed.

Thus, the cam sleeve 3 and the coil spring 9 are fitted onto the fork shaft 6. Therefore, when the cam sleeve 3 is moved from the engagement position to the disengagement position, the end face of the diametrically larger section 3a of the cam sleeve 3 pushes the stepped section 6a of the fork shaft 6 so that the fork shaft 6 is moved together with the cam sleeve 3. That is, when the cam sleeve 3 is moved toward the disengagement position, a load is applied directly to the fork shaft 6 without passing through the coil spring 9. In other words, the fork shaft 6 is moved by a thrust force applied from the cam sleeve 3.

The shift fork 10 is joined to the other end of the fork shaft 6 in the left side in FIG. 2. Specifically, the shift fork 10 comprises an arm section 10a protruding radially outwardly, and an arcuate engagement section 10b formed on a leading end of the arm section 10a. The shift fork 10 is engaged with a dog sleeve (not shown) in which dog teeth are formed on a leading end so as to reciprocate the dog sleeve in the axial direction.

In the example shown in FIG. 2, a support shaft 11 is inserted into a hollow space of the fork shaft 6. Specifically, one end of the support shaft 11 is supported by a case 12 holding a transmission (not shown), and the other end of the support shaft 11 is supported by a housing 13 integrated with the case 12. A bearing 14 such as a bush is interposed between the support shaft 11 and the fork shaft 6.

In the shifting mechanism, the engagement pin 4 is reciprocated between the first groove 2a and the second groove 2b by changing a rotational angle of the shift drum 1. In other words, a position of the engagement pin 4 in the axial direction of the shift drum 1 is changed by rotating the shift drum 1. Specifically, the cam sleeve 3 integrated with the engagement pin 4 is reciprocated in the axial direction by rotating the shift drum 1 so that the fork shaft 6 and the shift fork 10 are reciprocated in the axial direction. Consequently, the dog sleeve engaged with the shift fork 10 is moved in the axial direction to engage the dog teeth of the dog sleeve with another dog teeth or disengage the dog teeth of the dog sleeve from another dog teeth. In other words, the clutch is engaged or disengaged by rotating the shift drum 1.

Specifically, in a situation where the shift drum 1 is rotated at a reference angle, the engagement pin 4 is positioned within the first groove 2a so that the clutch is brought into disengagement. In order to engage the clutch, the shift drum 1 is rotated predetermined degrees so that the engagement pin 4 positioned in the first groove 2a enters the third groove 2c. In this situation, the clutch is brought into a transitional state to be engaged. Then, the shift drum 1 is further rotated predetermined degrees so that the engagement pin 4 positioned in the third groove 2c enters the second groove 2b. Consequently, the clutch is brought into engagement. In order to disengage the clutch in engagement, the shift drum 1 is further rotated predetermined degrees so that the engagement pin 4 positioned in the second groove 2b enters the fourth groove 2d. In this situation, the clutch is brought into a transitional state to be disengaged. Then, the shift drum 1 is further rotated 360 degrees from the reference angle so that the engagement pin 4 positioned the second groove 2b enters the first groove 2a again. Consequently, the clutch is brought into disengagement. To this end, the shift drum 1 may be rotated not only in the forward direction but also in the reverse direction.

However, if the dog teeth of the dog sleeve are in phase with another dog teeth to be engaged therewith during the process of engaging the clutch in disengagement, tips of the dog teeth of the dog clutch would come into contact with tips of another dog teeth to be engaged therewith. In this situation, the dog sleeve is not allowed to move further in the axial direction. That is, the shift fork 10 and the fork shaft 6 may not be moved in the axial direction toward the engagement position (i.e., toward the right side in FIG. 2) further than the tips of the dog teeth of the dog clutch coming into contact with the tips of another dog teeth. However, since the coil spring 9 is interposed between the fork shaft 6 and the cam sleeve 3, the cam sleeve 3 is still allowed to be moved to the engagement position while compressing the coil spring 9 by rotating the shift drum 1 at 360 degrees from the predetermined angle. That is, a difference between travelling amounts of the cam sleeve 3 and the fork shaft 6 may be absorbed by compressing the coil spring 9. For this reason, the shift drum 1 is allowed to be rotated at 360 degrees without applying an excessive load to the shifting mechanism. Whereas, in a situation where the dog teeth of the dog sleeve are out of phase with another dog teeth to be engaged therewith, the fork shaft 6 and the shift fork 10 may be moved toward the engagement position by the elastic force of the coil spring 9 thereby bringing the clutch into engagement.

During the process of engaging or disengaging the clutch, the engagement pin 4 slides on the wall surfaces of the cam groove 2. In this situation, a reaction force derived from the above-explained collision of the dog teeth, a sliding resistance acting between engagement surfaces of the sets of the dog teeth engaged with each other, a sliding resistance acting between the fork shaft 6 and the support shaft 11 and so on act against the load to reciprocate the engagement pin 4. Consequently, a friction derived from the above-mentioned reaction force and resistances acts between an outer race of the bearing 5 fitted onto the engagement pin 4 and each of the wall surfaces of the cam groove 2. That is, the engagement pin 4 is subjected not only to the load acting in the direction to push the cam sleeve 3 in the axial direction, but also to the load acting in the direction to rotate the cam sleeve 3 derived from the friction acting between the engagement pin 4 and the cam groove 2.

As described, the cam sleeve 3 and the fork shaft 6 are formed separately without being connected in the rotational direction. Therefore, a reaction force against the load acting in the direction to rotate the cam sleeve 3 may not be established by the fork shaft 6, and the cam sleeve 3 would be rotated by the load acting in the direction to rotate the cam sleeve 3. If the cam sleeve 3 is rotated, the engagement pin 4 will be inclined with respect to the cam groove 2 thereby increasing the sliding resistance. In addition, a contact area of the engagement pin 4 against the cam groove 2 will be reduced thereby increasing a damage of the engagement pin 4.

In order to avoid such disadvantages, according to the exemplary embodiment of the present disclosure, the shifting mechanism is provided with a support structure to restrict a rotation of the cam sleeve 3. In the shifting mechanism shown in FIGS. 1 and 2, the support structure comprises a support stem 15 extending parallel to a center axis of the cam sleeve 3, and a projection 17 formed integrally with the cam sleeve 3. The projection 17 has a stopper 16 that comes into contact with the support stem 15 when the cam sleeve 3 is rotated.

Specifically, one end of the support stem 15 is supported by the case 12, and the other end of the support stem 15 is supported by the housing 13. In the example shown in FIG. 2, the case 12 comprises an outer wall 12a and an inner wall 12b as a partition wall, and one end of the support stem 15 is supported by the inner wall 12b of the case 12.

As illustrated in FIGS. 1 and 2, the projection 17 is a plate member protruding from the cam sleeve 3 toward the support stem 15, and a slotted hole (i.e., a through hole) 16a is formed in a leading end section of the projection 17 to serve as the stopper 16. Specifically, the slotted hole 16a has a length in a direction along the normal line of the cam sleeve 3 longer than its width, and the support stem 15 is inserted into the slotted hole 16a. More specifically, in the slotted hole 16a, a difference between the width of the slotted hole 16a and a diameter of the support stem 15 is less than a difference between the length of the slotted hole 16a and the diameter of the support stem 15.

Accordingly, a clearance between an inner wall surface of the slotted hole 16a and an outer circumferential surface of the support stem 15 in the rotational direction of the cam sleeve 3 is narrower than a clearance between the inner wall surface of the slotted hole 16a and the outer circumferential surface of the support stem 15 in a direction along a line connecting the center axis of the cam sleeve 3 and a center axis of the support stem 15.

Specifically, a width dimension of the slotted hole 16a with respect to an outer diameter of the support stem 15 is set based on a tolerable rotational angle of the cam sleeve 3. Therefore, even if the support stem 15 and the center axis of the cam sleeve 3 are not positioned accurately at designed positions, the support stem 15 is allowed to be inserted into the slotted hole 16a by rotating the cam sleeve 3. In addition, an axial movement of the cam sleeve 3 will not be hindered by a contact between the slotted hole 16a and the support stem 15.

However, a distance between a center axis of the support stem 15 and the center axis of the cam sleeve 3 may vary depending on an accumulated value of e.g., installation errors of the case 12 and the housing 13, and machining errors of installation sites of the support stem 15 and the support shaft 11 formed in the case 12 and the housing 13. Therefore, a size of the slotted hole 16a in the longitudinal direction is set such that the support stem 15 will not come into contact to the inner wall surface of the slotted hole 16a in the longitudinal direction, even if the support stem 15 and the cam sleeve 3 are installed such that the center axes of those members come closest to each other within the tolerance limit.

Thus has been described, in the shifting mechanism, the cam sleeve 3 is provided with the engagement pin 4 that is reciprocated along the cam groove 2 of the shift drum 1, and the fork shaft 6 is formed integrally with the shift fork 10. The cam sleeve 3 and the fork shaft 6 are formed separately from each other so that the cam sleeve 3 and the fork shaft 6 are allowed to rotate relatively to each other. In addition, a rotation of the cam sleeve 3 is restricted by the support structure. Specifically, the cam sleeve 3 is subjected to the load in the rotational direction derived from the friction while the engagement pin 4 slides on the wall surfaces of the cam groove 2. In this situation, the support stem 15 comes into contact to the inner wall surface of the slotted hole 16a formed in the projection 17 thereby restricting a rotation of the cam sleeve 3. Therefore, a posture of the engagement pin 4 will not be changed by the cam sleeve 3. For this reason, the sliding resistance between the wall surface of the cam groove 2 and the engagement pin 4 will not be increased, and the damage of the engagement pin 4 may be limited.

In addition, the clearance between the inner wall surface of the slotted hole 16a and the outer circumferential surface of the support stem 15 in the direction along the normal line is maintained wider than the clearance between the inner wall surface of the slotted hole 16a and the outer circumferential surface of the support stem 15 in the rotational direction of the cam sleeve 3. Therefore, an interference between the support stem 15 and the slotted hole 16a will not be caused even if the support stem 15 and the cam sleeve 3 are installed such that the center axes of those members come close to each other. For this reason, the sliding resistance of the cam sleeve 3 reciprocating on the fork shaft 6 may be reduced.

Further, oil may be held in the clearance maintained in the direction along the normal line of the cam sleeve 3. Therefore, the oil can be supplied easily to sliding members in the vicinity of the cam sleeve 3 so as to limit damages of the sliding members such as the fork shaft 6.

According to the present disclosure, a plurality of cam grooves may be formed on the shift drum. In this case, the engagement pin may be fitted into each of the cam grooves. Otherwise, a plurality of engagement pins may also be inserted into the cam groove in an out-of-phase manner.

Here will be explained another example of the shifting mechanism in which two engagement pins are engaged with one cam groove with reference to FIGS. 4, 5A, 5B, 5C, and 5D. That is, the shifting mechanism according to another example is adapted to manipulate two clutches by one shift drum. Specifically, the shifting mechanism according to another example is adapted to shift an operating mode in order among: a first mode in which one of the clutches is engaged and the other one of the clutches is disengaged; a second mode in which both of the clutches are engaged; a third mode in which one of the clutches is disengaged and the other one of the clutches is engaged; and a fourth mode in which both of the clutches are disengaged.

Figure 4:
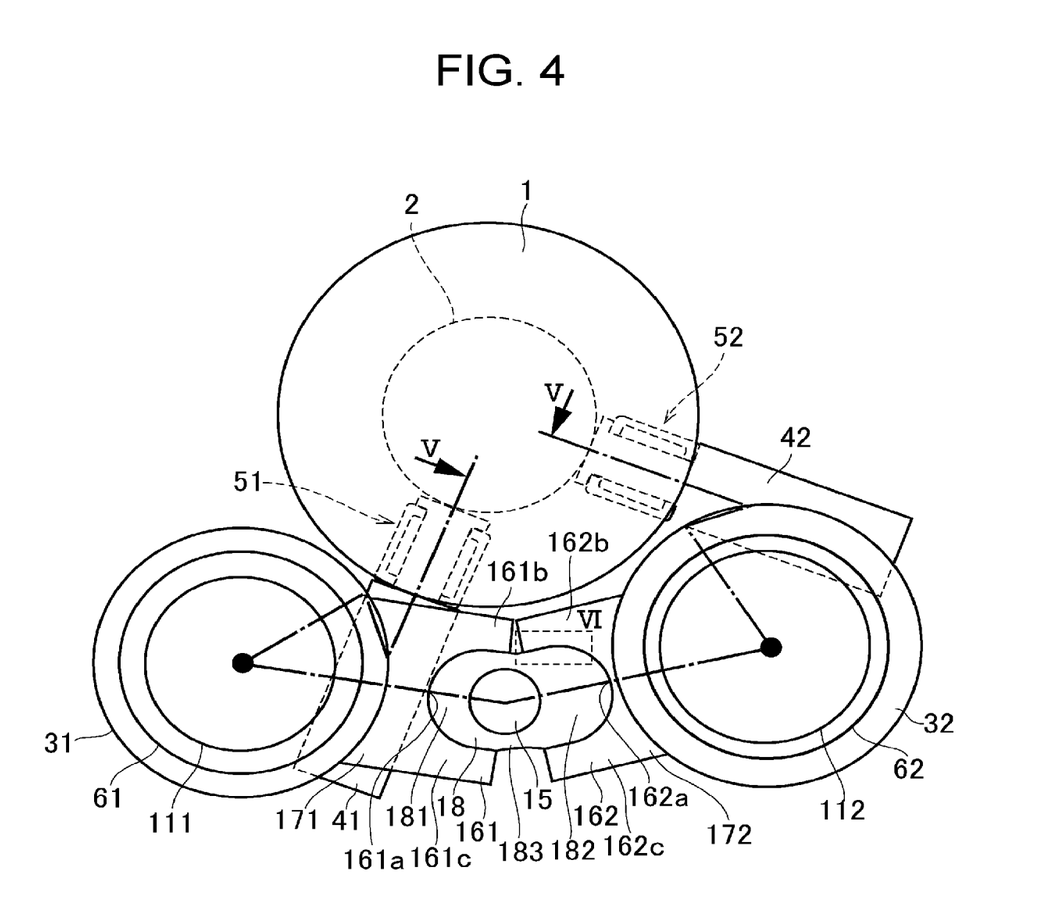
FIG. 4 is a front view showing another example of the shifting mechanism in which two cam sleeves are arranged in the shifting mechanism.

As illustrated in FIG. 4, according to another example, the shifting mechanism comprises: a first cam sleeve 31 that engages and disengages a first clutch; a first engagement pin 41 that is formed integrally with the first cam sleeve 31; a second cam sleeve 32 that engages and disengages a second clutch; and a second engagement pin 42 that is formed integrally with the second cam sleeve 32. Specifically, the first cam sleeve 31 and the second cam sleeve 32 are arranged around the rotational center axis of the shift drum 1 out of phase by approximately 90 degrees. Likewise, the first engagement pin 41 and the second engagement pin 42 are arranged around the rotational center axis of the shift drum 1 out of phase by approximately 90 degrees, and both of the first engagement pin 41 and the second engagement pin 42 are fitted into the cam groove 2.

Structures of the first cam sleeve 31 and the second cam sleeve 32 are similar to that of the cam sleeve 3 of the shifting mechanism according to the foregoing example. In the shifting mechanism according to another example, a first fork shaft 61 extends coaxially with the first cam sleeve 31, and a second fork shaft 62 extends coaxially with the second cam sleeve 32. The first fork shaft 61 is joined to a first shift fork 101, and the second fork shaft 62 is joined to the second shift fork 102. Structures of the first fork shaft 61 and the second fork shaft 62 are similar to that of the fork shaft 6 of the shifting mechanism according to the foregoing example, and structures of the first shift fork 101 and the second shift fork 102 are similar to that of the shift fork 10 of the shifting mechanism according to the foregoing example. In the following descriptions, explanations for the structure of the shifting mechanism in common with those of the foregoing example will be omitted. In addition, "1" is suffixed to reference numerals of the elements involved in actuation of the first clutch, and "2" is suffixed to reference numerals of the elements involved in actuation of the second clutch.

In the example shown in FIG. 4, the support stem 15 is arranged between the first cam sleeve 31 and the second cam sleeve 32. Specifically, the support stem 15 is arranged such that a virtual line connecting the center axis of the first cam sleeve 31 and the center axis of the second cam sleeve 32 via the center axis of the support stem 15 is drawn as a V-line opening toward the shift drum 1.

The first cam sleeve 31 is formed integrally with a first projection 171 protruding toward the support stem 15, and a U-shaped first cutout 161 is formed on a leading end of the first projection 171. The first cutout 161 comprises an arcuate first bottom section 161*a*, and a pair of protrusions 161*b* and 161*c* extending parallel to each other across a normal line of the first cam sleeve 31. As described later, the first cutout 161 comes into contact to an after-mentioned first contact section 181 of a positioner 18 thereby restricting a rotation of the first cam sleeve 31.

Likewise, the second cam sleeve 32 is formed integrally with a second projection 172 protruding toward the support stem 15, and a U-shaped second cutout 162 is formed on a leading end of the second projection 172. The second cutout 162 comprises an arcuate second bottom section 162*a*, and a pair of protrusions 162*b* and 162*c* extending parallel to each other across a normal line of the second cam sleeve 32. As described later, the second cutout 162 comes into contact to an after-mentioned second contact section 182 of the positioner 18 thereby restricting a rotation of the second cam sleeve 32.

The support stem 15 is integrated with the positioner 18 comprising the first contact section 181 projecting toward the first cam sleeve 31, and the second contact section 182 projecting toward the second cam sleeve 32. The first contact section 181 is situated between the protrusions 161*b* and 161*c*, and a width of the first contact section 181 is narrower than a clearance between the protrusions 161*b* and 161*c*. Specifically, the first contact section 181 has an arcuate outer surface, and protrudes from leading ends of the protrusions 161*b* and 161*c* toward the support stem 15. A curvature radius of the outer surface of the first contact section 181 is shorter than a width of the first cutout 161. That is, a width of the first contact section 181 is widest at a portion situated at a longitudinal center (in a direction along the normal line of the first cam sleeve 31) of the first cutout 161. Therefore, a clearance between a leading end of the protrusion 161*b* or 161*c* of the first cutout 161 and the first contact section 181 in the width direction of the first cutout 161 is wider than a clearance between the longitudinal center of the protrusion 161*b* or 161*c* of the first cutout 161 and the first contact section 181 in the width direction of the first cutout 161.

In addition, a difference between: the clearance between the protrusions 161*b* and 161*c*, and a width (i.e., a diameter) of the first contact section 181 in the width direction of the first cutout 161; is less than a clearance between a deepest site of the first bottom section 161*a* and a tip of the first contact section 181.

Figure 6:
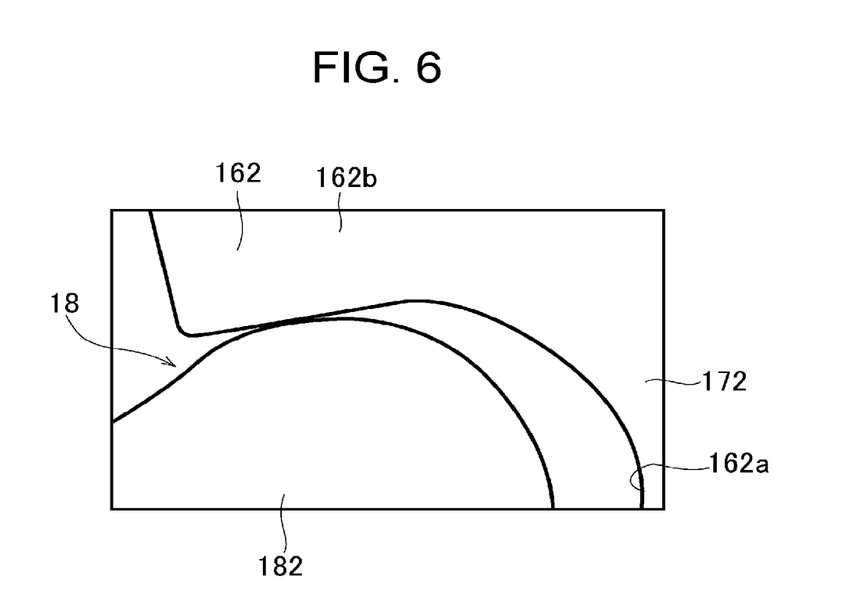
FIG. 6 is a partial enlarged view showing VI section in FIG. 4 in an enlarged scale.

Likewise, the second contact section 182 is situated between the protrusions 162*b* and 162*c*, and a width of the second contact section 182 is narrower than a clearance between the protrusions 162*b* and 162*c*. Specifically, as illustrated in FIG. 6, the second contact section 182 has an arcuate outer surface, and protrudes from leading ends of the protrusions 162*b* and 162*c* toward the support stem 15. A curvature radius of the outer surface of the second contact section 182 is shorter than a width of the second cutout 162. That is, a width of the second contact section 182 is widest at a portion situated at a longitudinal center (in a direction along the normal line of the second cam sleeve 32) of the second cutout 162. Therefore, a clearance between a leading end of the protrusion 162*b* or 162*c* of the second cutout 162 and the second contact section 182 in the width direction of the second cutout 162 is wider than a clearance between the longitudinal center of the protrusion 162*b* or 162*c* of the second cutout 162 and the second contact section 182 in the width direction of the first cutout 161.

In addition, a difference between: the clearance between the protrusions 162*b* and 162*c*, and a width (i.e., a diameter) of the second contact section 182 in the width direction of the second cutout 162; is less than a clearance between a deepest site of the second bottom section 162*a* and a tip of the second contact section 182.

The first contact section 181 and the second contact section 182 are joined to each other through a joint section 183, and the support stem 15 is inserted into a through hole formed in the joint section 183. As illustrated in FIGS. 5A to 5D, in the shifting mechanism according to another example, the support stem 15 comprises: a diametrically larger section extending in a section closer to the housing 13; a diametrically smaller section extending in a section closer to the case 12; and a stepped portion formed between the diametrically larger section and the diametrically smaller section. The joint section 183 of the positioner 18 is clamped by the stepped portion of the support stem 15 and the inner wall 12*b* of the case 12 thereby fixing a position of the positioner 18 in the axial direction. Instead, a rotation of the positioner 18 may also be restricted by fixing the positioner 18 to the inner wall 12*b* by e.g., a bolt.

Figure 5A:
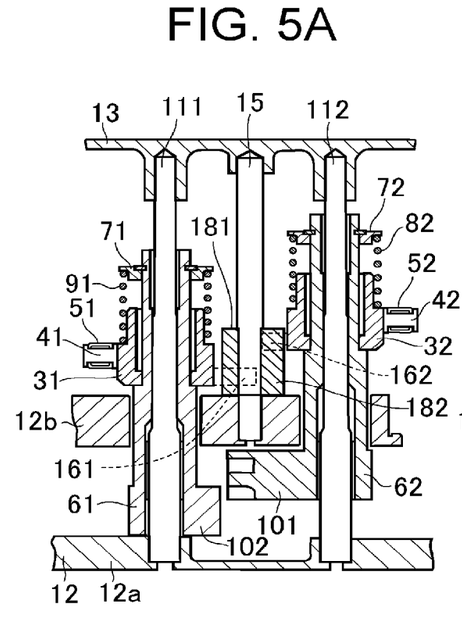
Figure 5B:
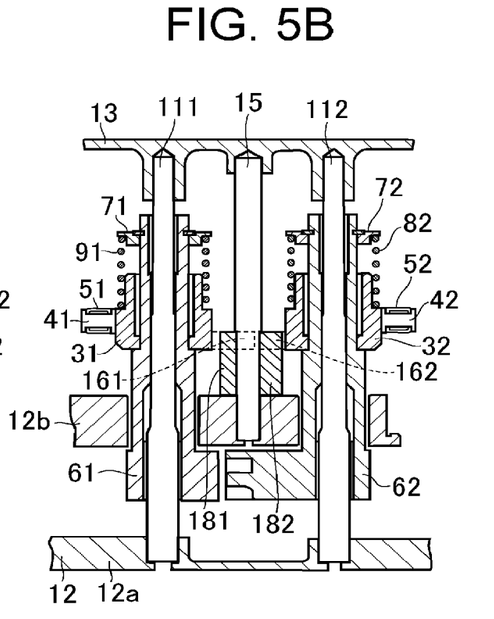

According to another example, in a situation where the shift drum 1 is rotated at a reference angle, the first engagement pin 41 is positioned within the first groove 2*a* and the second engagement pin 42 is positioned within the second groove 2*b*. In this situation, as illustrated in FIG. 5A, the first fork shaft 61 is positioned at the disengagement position, and the second fork shaft 62 is positioned at the engagement position. Then, when the shift drum 1 is further rotated predetermined degrees, the first engagement pin 41 positioned in the first groove 2*a* enters the second groove 2*b* via the third groove 2*c*, but a position of the second engagement pin 42 is merely shifted from one end of the second groove 2*b* to the other end of the second groove 2*b*. That is, the second engagement pin 42 does not enter the fourth groove 2*d*. Consequently, as illustrated in FIG. 5B, both of the first fork shaft 61 and the second fork shaft 62 are positioned at the engagement positions. As described, both of the first cutout 161 and the second cutout 162 are shaped into U-shape, and the leading ends of the first cutout 161 and the leading ends of the second cutout 162 will not come into contact with each other. Therefore, the first cutout 161 and the second cutout 162 are allowed to be engaged with the positioner 18 at the same axial position along the support stem 15 even when both of the first fork shaft 61 and the second fork shaft 62 are positioned at the engagement positions. In other words, it is not necessary to offset the first cutout 161 and the second cutout 162 in the axial direction of the support stem 15. For this reason, lengths of the support stem 15 and the positioner 18 may be shortened.

Figure 5C:
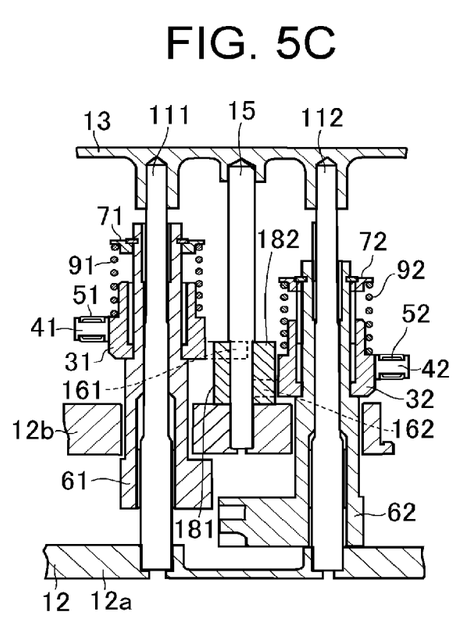

Then, when the shift drum 1 is further rotated predetermined degrees, the first engagement pin 41 remains within the second groove 2*b*, but the second engagement pin 42 enters the first groove 2*a* via the fourth groove 2*d*. Consequently, as illustrated in FIG. 5C, the first fork shaft 61 remains at the engagement position, but the second fork shaft 62 is moved to the disengagement position. That is, the first cutout 161 and the second cutout 162 pass each other in the axial direction of the support stem 15 as a result of rotating the shift drum 1. Nonetheless, since both of the first cutout 161 and the second cutout 162 are shaped into U-shape, the leading ends of the first cutout 161 and the leading ends of the second cutout 162 will not come into contact with each other. Therefore, it is not necessary to arrange the first cutout 161 and the second cutout 162 in such a manner as not to pass each other in the axial direction of the support stem 15. For this reason, lengths of the support stem 15 and the positioner 18 may be shortened.

Figure 5D:
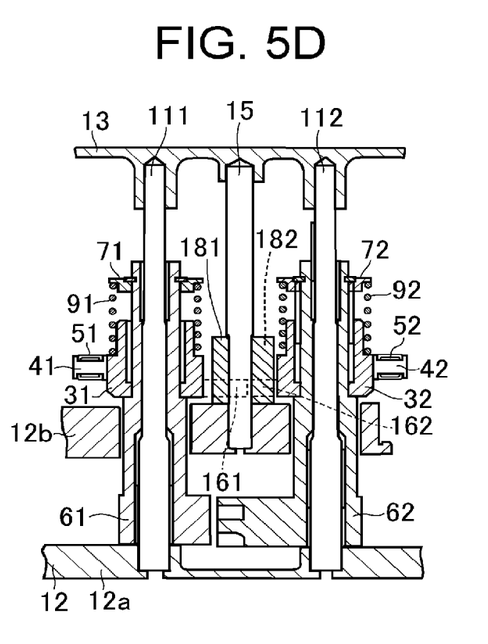

Thereafter, when the shift drum 1 is further rotated predetermined degrees, the first engagement pin 41 positioned in the second groove 2*b* enters the first groove 2*a* via the fourth groove 2*d*, but the second engagement pin 42 remains within the first groove 2*a*. Consequently, as illustrated in FIG. 5D, both of the first fork shaft 61 and the second fork shaft 62 are positioned at the disengagement positions. Nonetheless, since both of the first cutout 161 and the second cutout 162 are shaped into U-shape, the leading ends of the first cutout 161 and the leading ends of the second cutout 162 will not come into contact with each other. Therefore, the first cutout 161 and the second cutout 162 are allowed to be engaged with the positioner 18 at the same axial position along the support stem 15 even when both of the first fork shaft 61 and the second fork shaft 62 are positioned at the disengagement positions. For this reason, lengths of the support stem 15 and the positioner 18 may be shortened.

As described, the first cutout 161 is shaped into U-shape. In addition, the clearance between the leading end of the protrusion 161*b* or 161*c* of the first cutout 161 and the first contact section 181 in the width direction of the first cutout 161 is wider than the clearance between the longitudinal center of the protrusion 161*b* or 161*c* of the first cutout 161 and the first contact section 181 in the width direction of the first cutout 161. Therefore, the leading end of the protrusion 161*b* or 161*c* of the first cutout 161 will not come into contact with the first contact section 181 due to machining errors and installation errors of the support stem 15 and the first cam sleeve 31. For this reason, damages of the first contact section 181 and the first cutout 161 may be limited, and a sliding resistance of the first cam sleeve 31 will not be increased.

As also described, the clearance between the deepest site of the first bottom section 161*a* and the tip of the first contact section 181 is wider than the clearance between the protrusions 161*b* or 161*c* and the first contact section 181. Therefore, an interference between the first contact section 181 and first bottom section 161*a* will not be caused even if the support stem 15 and the first cam sleeve 31 are installed such that the center axes of those members come close to each other. For this reason, the sliding resistance of the first cam sleeve 31 reciprocating on the first fork shaft 61 may be reduced. In addition, oil may be held in the clearance between the first contact section 181 and first bottom section 161*a*. Therefore, the oil can be supplied easily to sliding members in the vicinity of the first cam sleeve 31 so as to limit damages of the sliding members such as the first fork shaft 61.

Likewise, the second cutout 162 is also shaped into U-shape. In addition, the clearance between the leading end of the protrusion 162*b* or 162*c* of the second cutout 162 and the second contact section 182 in the width direction of the second cutout 162 is wider than the clearance between the longitudinal center of the protrusion 162*b* or 162*c* of the second cutout 162 and the second contact section 182 in the width direction of the second cutout 162. Therefore, the leading end of the protrusion 162*b* or 162*c* of the second cutout 162 will not come into contact with the second contact section 182 due to machining errors and installation errors of the support stem 15 and the second cam sleeve 32.

For this reason, damages of the second contact section 182 and the second cutout 162 may be limited, and a sliding resistance of the second cam sleeve 32 will not be increased.

In addition, the clearance between the deepest site of the second bottom section 162*a* and the tip of the second contact section 182 is wider than the clearance between the protrusions 162*b* or 162*c* and the second contact section 182. Therefore, an interference between the second contact section 182 and second bottom section 162*a* will not be caused even if the support stem 15 and the second cam sleeve 32 are installed such that the center axes of those members come close to each other. For this reason, the sliding resistance of the second cam sleeve 32 reciprocating on the second fork shaft 62 may be reduced. In addition, oil may be held in the clearance between the second contact section 182 and second bottom section 162*a*. Therefore, the oil can be supplied easily to sliding members in the vicinity of the second cam sleeve 32 so as to limit damages of the sliding members such as the second fork shaft 62.

Although the above exemplary embodiments of the present disclosure have been described, it will be understood by those skilled in the art that the present disclosure should not be limited to the described exemplary embodiments, and various changes and modifications can be made within the scope of the present disclosure. For example, the U-shaped cutout shown in FIG. 4 may also be applied to the projection 17 shown in FIG. 1 to restrict a rotation of the cam sleeve 3 formed integrally with the engagement pin 4. In addition, in the shifting mechanism shown in FIGS. 1 and 2, the support stem 15 may be provided with the positioner 18.

What is claimed is:

1. A shifting mechanism, comprising:
   a shift drum on which a cam groove is formed;
   a cam sleeve having an engagement pin that is inserted into the cam groove to be reciprocated by the cam groove;
   a fork shaft that is reciprocated between predetermined positions by a thrust force of the cam sleeve established by rotating the shift drum;
   a support stem that extends parallel to a center axis of the cam sleeve; and
   a projection that is formed integrally with the cam sleeve,
   wherein the projection comprises a through hole to which the support stem is inserted,
   wherein the through hole includes a slotted hole having a length in a direction along a normal line of the cam sleeve longer than a width thereof, and
   wherein a rotation of the cam sleeve is restricted when the support stem comes into contact to an inner wall surface of the slotted hole.

2. The shifting mechanism as claimed in claim 1, further comprising an elastic member that is deformed in a situation where a traveling amount of the cam sleeve in an axial direction along the center axis of the cam sleeve and a travelling amount of the fork shaft in the axial direction are different.

\* \* \* \* \*